March 6, 1956 R. E. DAY 2,737,016
AFTERBURNER CONTROLS
Filed Sept. 15, 1950 6 Sheets-Sheet 1
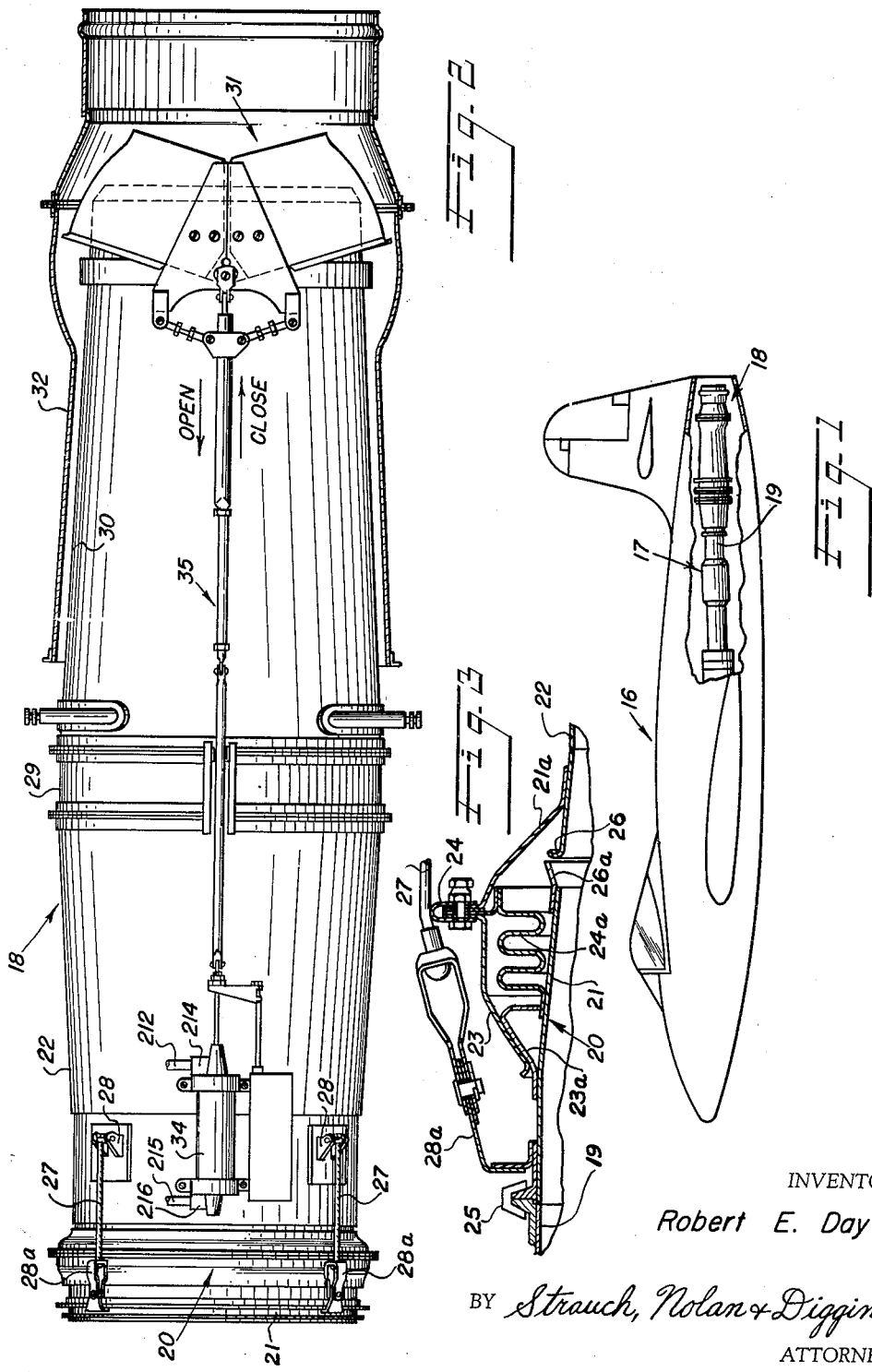
INVENTOR
Robert E. Day
BY Strauch, Nolan & Diggins
ATTORNEYS

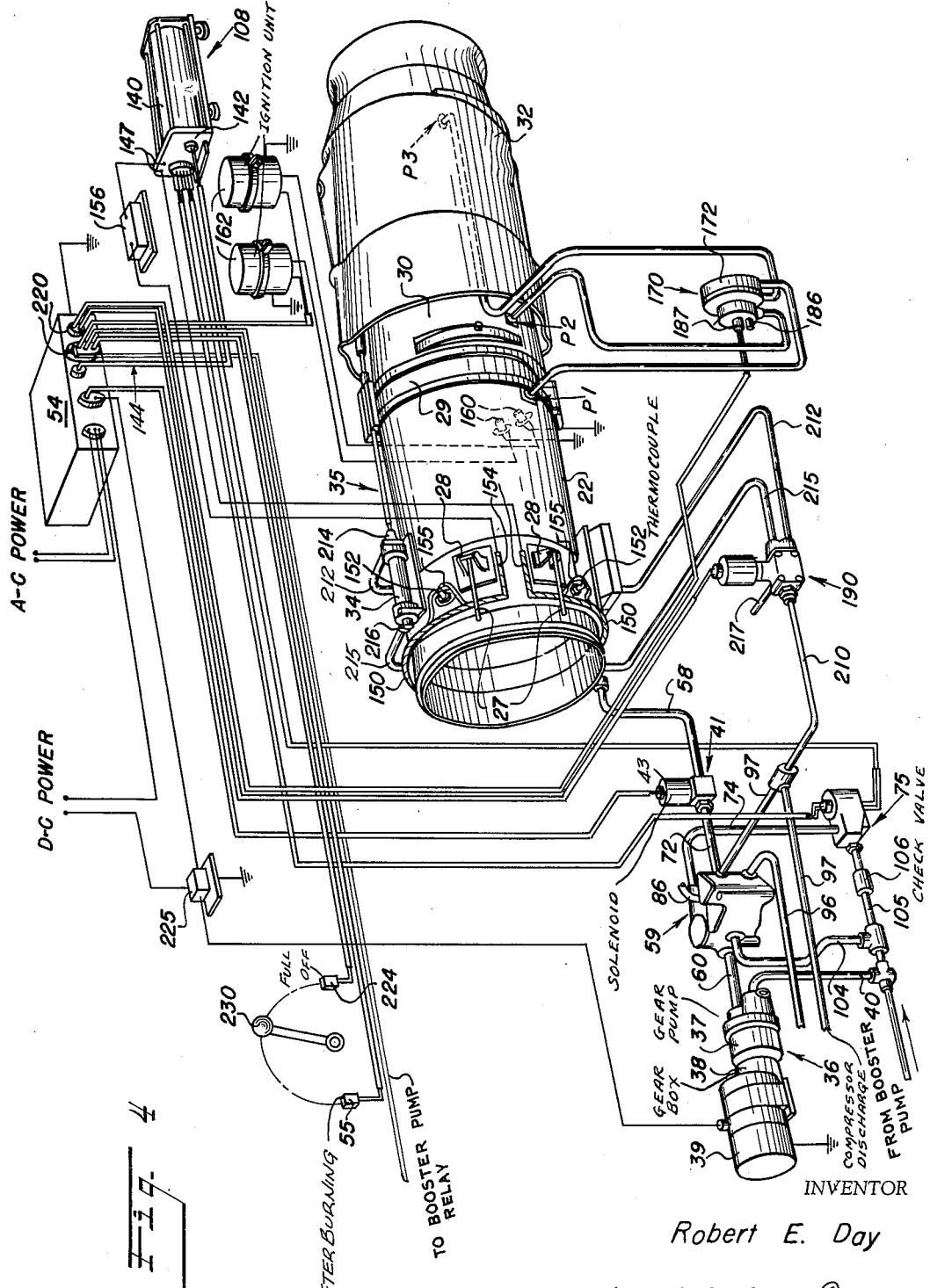

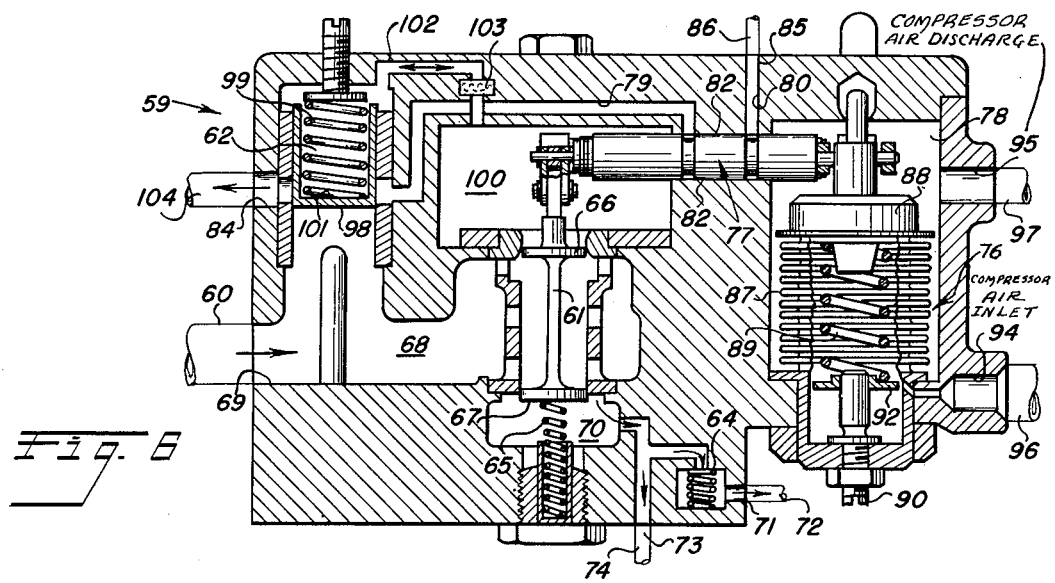
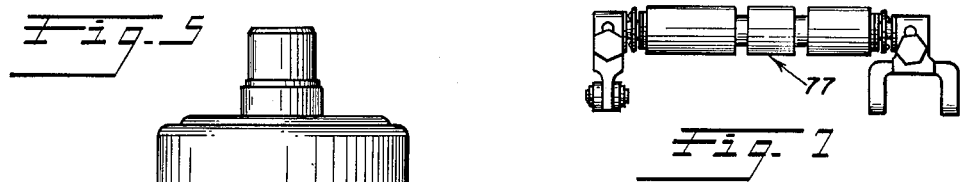
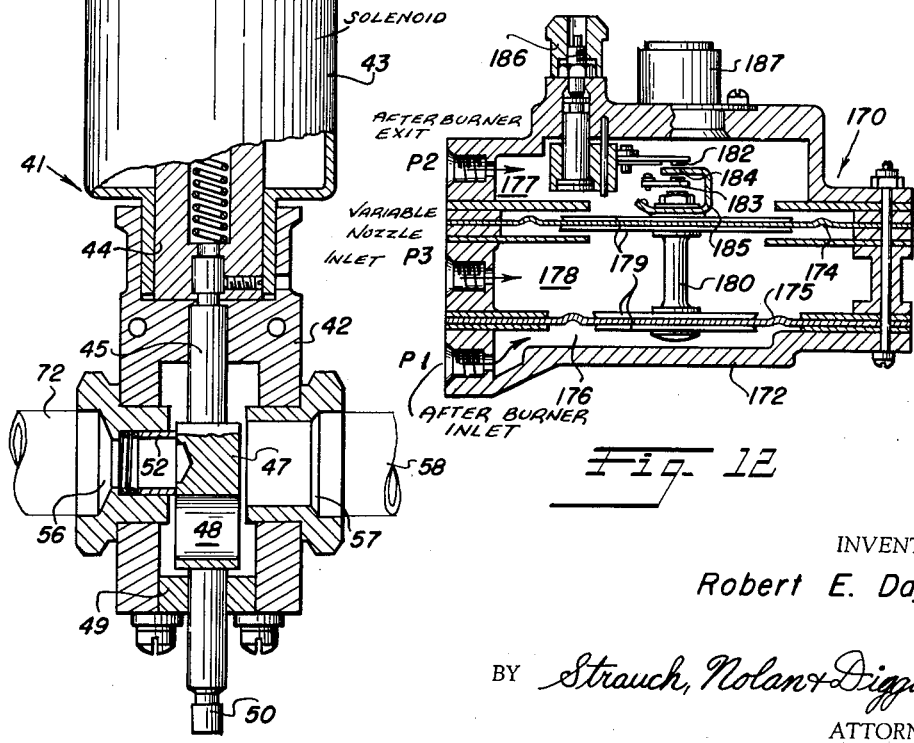

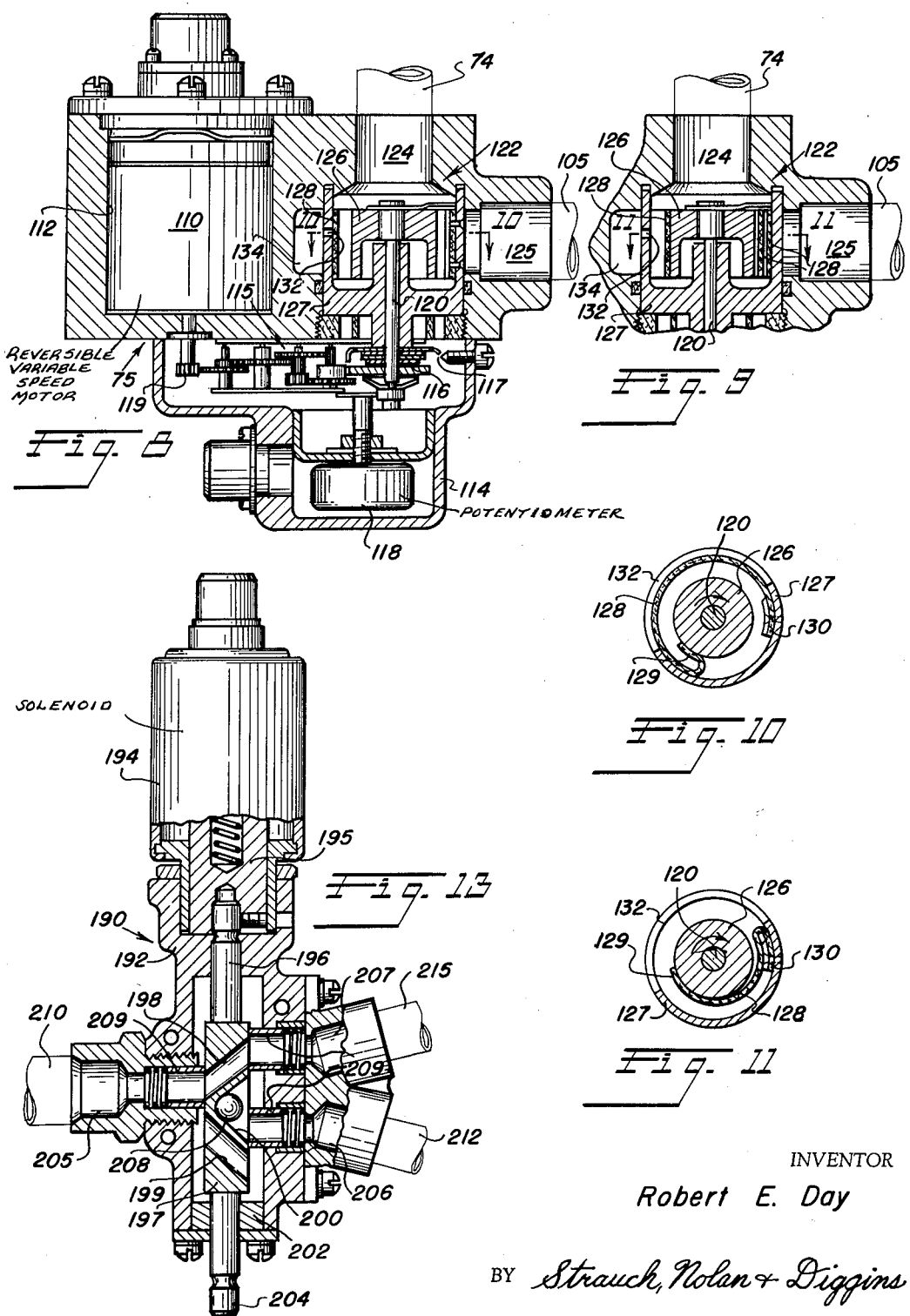

March 6, 1956 R. E. DAY 2,737,016
AFTERBURNER CONTROLS
Filed Sept. 15, 1950 6 Sheets-Sheet 5
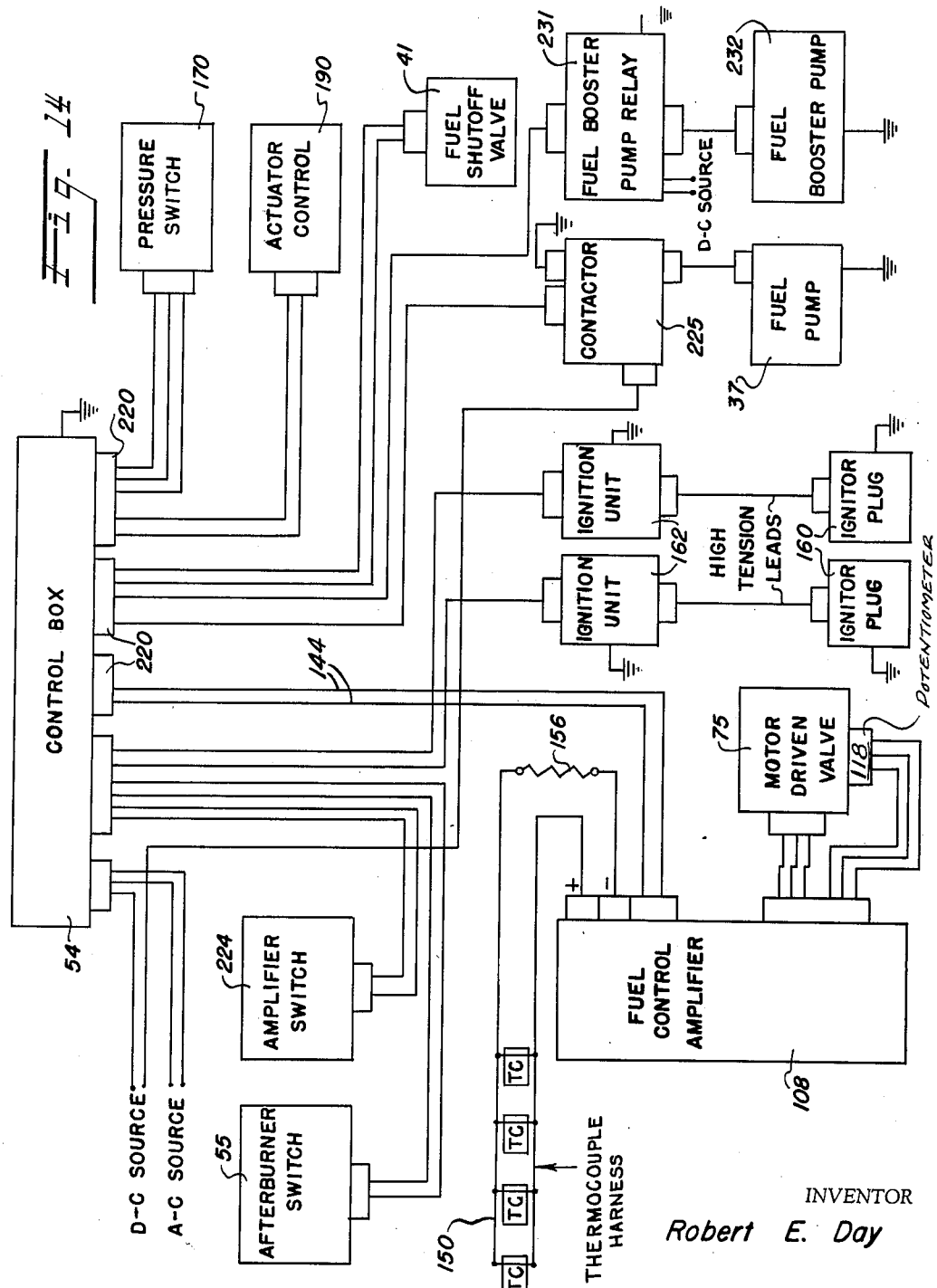
INVENTOR
Robert E. Day
BY Strauch, Nolan + Diggins
ATTORNEYS

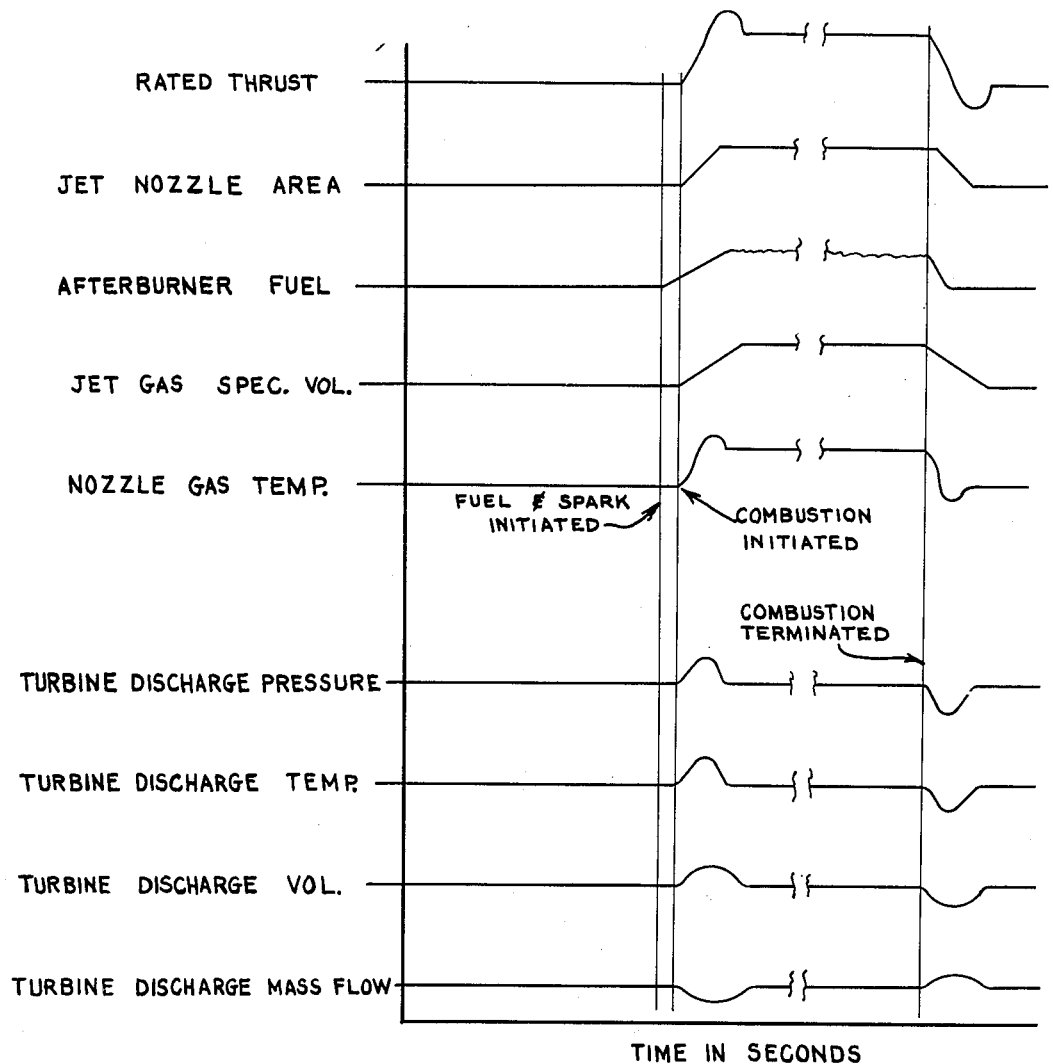

United States Patent Office 2,737,016
Patented Mar. 6, 1956

2,737,016

AFTERBURNER CONTROLS

Robert E. Day, San Diego, Calif., assignor to Solar Aircraft Company, San Diego, Calif., a corporation of California Application September 15, 1950, Serial No. 185,124

6 Claims. (Cl. 60—35.6)

This invention relates to pressure and temperature responsive controls and methods for the indication and regulation of flows in ducts and conduits, and has particular reference to controls and methods for regulating the fuel supply and nozzle position of jet engines with and without afterburning.

Power plants with which the invention is primarily concerned may be termed "turboramjets." In such power plants an afterburner or ramjet assembly is secured to the turbojet or primary engine at its downstream end and is provided to increase, for short intervals of time, the thrust developed by the primary engine by injecting additional fuel into the primary engine exhaust gases and igniting the fuel-gas mixture. However, to secure top performance of the power plant during periods of afterburning, operating conditions within the primary engine must be maintained as near to normal as possible. Normal operating conditions mean those conditions in the primary engine which are within set limits established by the engine designer for the engine using a plain conical discharge jet nozzle. These limits are based upon the appreciable variations which occur in internal conditions as the inlet air changes in temperature, pressure and density, and the various metallurgical, aerodynamic and thermodynamic limits which must not be exceeded for appreciable time periods if the designer is to produce a good design. The turbojet engine with a fixed nozzle is, therefore, a compromise of many factors within which the internal conditions are permitted to vary uncompensated within the designer's pre-selected limits. It is the operating conditions within these limits which are referred to as normal operating conditions. This range of uncompensated variations is, of course, permitted as a practical design expedient.

Afterburner combustion increases the volume and temperature of the discharged gases which in turn tend to disrupt the primary engine normal operating conditions. To broadly compensate therefor, the two-position nozzle has been made a part of an afterburner assembly as disclosed in application Serial No. 12,246 filed March 1, 1948, by R. E. Day and F. J. Hill. However, providing a two-position nozzle is only the initial step towards maintaining normal operating conditions which must not only be maintained during the transition from no afterburning to afterburning and return, but must also be maintained throughout the period of afterburning. This requires quick opening and closing of the jet nozzle to and from its enlarged area position to decrease the period of time that the internal conditions are over or under normal as will be explained more fully in connection with the description of the afterburning cycle chart in the drawings. It also requires regulating the fuel for afterburner combustion at the rate required to satisfy the new condition of increased jet nozzle area so that the primary engine will be subjected to effectively the same acceptable gas conditions at its turbine discharge as it would under the conditions of a plain conical tailpipe, or with an afterburner assembly having a closed nozzle and no combustion therein. Thus, to maintain substantially normal conditions in the primary engine there must be a closely regulated control system.

In actual flight below supersonic speeds the afterburner is used only for tactical or combat emergencies because of the additional amount of fuel consumed during the afterburning. When the greatly increased thrust provided by the afterburner is needed, however, it is usually needed with the utmost speed and often the life of the pilot and the fate of the aircraft depends on just how rapidly the added thrust may be obtained. As an example, the added thrust provided by the afterburner is often needed by Navy jet powered aircraft when a "wave off" is received during an attempted carrier landing. Under this condition, when full power is urgently needed, the afterburner will provide an augmented thrust during the brief but critical several seconds that the rotor inertia of the primary engine causes the engine R. P. M. to lag behind the throttle position. For this reason, whenever the afterburner is switched on, there must be rapid and reliable automatic operation of the many necessary afterburner assembly functions, such as fuel supply, ignition, movement of the nozzle to open position, and so forth.

In addition to needing a rapid response when the afterburner is switched on, there must be an even more rapid response should blowout occur for any reason, or when the afterburner is switched off, particularly with respect to the closing of the jet nozzle to prevent reduction of thrust below normal, as will be explained.

As outlined above, once partial compensation is made for afterburning through nozzle control, further compensation must still be made during afterburner combustion for the wide variations in altitude and airspeed likely to occur in flight. This further compensation must be accomplished by providing additional accurate and sensitive control which constantly adjust the rate of fuel flow to the afterburner in order that combustion therein may be regulated to maintain approximately normal conditions in the primary engine.

From the foregoing brief discussion of the control problems of an afterburner assembly, it will be apparent that the manual and rudimentary automatic controls of the prior art do not provide an adequate solution to the many complex problems involved. To successfully solve these complex problems, the present invention provides a completely automatic afterburner assembly system which rapidly and dependably coordinates afterburner operation and nozzle operation, and functions in response to pressures and temperatures within the jet power plant to maintain proper fuel flow to the afterburner regardless of the variations, due to the flight of the aircraft, in such factors as altitude, air speed, ambient temperature and ambient pressure.

With these and other considerations in view it is a prime object of this invention to provide an accurate and dependable control system for an afterburner assembly which will enable top jet power plant performance during afterburner operation.

It is a further important object of the invention to provide a pressure and temperature responsive afterburner assembly control system which allows normal operating conditions to be maintained in the primary jet engine when the afterburner is in operation.

Another object of the invention is to provide an afterburner assembly control system having a reliable and highly efficient start-up and shut-down sequence control.

A further object of the invention is to provide an afterburner assembly control system which closely and accurately coordinates afterburner operation with the operation of a variable area jet nozzle.

A still further object of the invention is to provide an afterburner assembly control system which will control the afterburner fuel supply in response to pressures and temperatures in the jet power plant so that the proper amount of fuel is supplied to the afterburner under all conditions of flight.

Another object of the invention is to provide an afterburner assembly control system which will automatically close the jet nozzle when combustion is extinguished for any reason.

Other objects and advantages will be apparent from the following description in conjunction with the accompanying drawings and from the appended claims. The accompanying drawings in which like reference numerals are used to designate similar parts throughout, illustrate the preferred embodiment for the purpose of disclosing the invention. The drawings, however, are not to be taken in a limiting or restrictive sense since it will be apparent to those skilled in the art that various changes in the illustrated construction may be resorted to without in any way exceeding the scope of the invention.

In the drawings:

Figure 1 illustrates a side elevation of an aircraft partially broken away to show a jet power plant mounted therein;

Figure 2 illustrates a plan view of an afterburner assembly;

Figure 3 illustrates a detailed cross-section of the main engine-afterburner assembly flexible joint;

Figure 4 illustrates a schematic perspective of the afterburner assembly and control system embodying the invention;

Figure 5 is an elevation partly in section of the fuel shut-off valve;

Figure 6 is an elevation in section of the pressure operated valve;

Figure 7 is detailed plan view of the lever assembly of the valve of Figure 6;

Figure 8 is an elevation in section of the motor driven valve showing the valve in closed position;

Figure 9 is a partial elevation in section of the motor driven valve of Figure 8 showing the valve in open position;

Figure 10 is a plan view of the valve disc and strap taken along line 10—10 of Fig. 8 showing the valve in closed position;

Figure 11 is a plan view of the valve disc and strap taken along line 11—11 of Fig. 9 showing the valve in open position;

Figure 12 is an elevation in section of the pressure switch;

Figure 13 is an elevation partially in section of the actuator control valve;

Figure 14 is a schematic wiring diagram of the afterburner control circuit; and

Figure 15 is a chart showing changes in operating conditions during an afterburning cycle.

Referring to Figure 1 of the drawings, an aircraft, generally indicated at 16, is illustrated having a jet power plant mounted in the after portion thereof. The power plant comprises a primary jet engine, generally indicated at 17, and an afterburner assembly, generally indicated at 18, secured to the tailpipe or exhaust duct 19 of the primary engine 17.

The afterburner assembly 18 is secured to the main engine tailpipe 19 by means of a flexible joint assembly 20, Figs. 2 and 3, which is a non-rigid, gas sealed tailpipe connector which compensates for possible installation misalignment of primary engine or afterburner assembly and allows for fuselage flexure due to flight maneuvers. The flexible joint comprises a connector section or shell 21, an annular member 21a welded to the forward end of the afterburner diffuser section 22, and a frusto-conical segment 23 and toroidal segment 23a in sliding contact with each other. Frusto-conical segment 23 is secured to member 21a by means of a gas tight seal 24 as shown in Fig. 3, and member 23a is welded to the connector section 21.

A gas seal in the form of a flexible bellows 24a is secured at one end to connector section 21 and at its other end to the seal 24. Because of the sliding contact between members 23 and 23a and the flexibility of bellows 24a relative movement is possible between the primary engine 17 and afterburner assembly 18. The segment 23 may be disconnected at 24 and moved to the left as viewed in Figure 3 to inspect the bellows 24a, and if any difficulty is found the entire flexible joint assembly between seal 24 and a quick disconnect clamp 25 may be removed and replaced. The outwardly turned flange 26 on the forward end of diffuser section 22 and the annular conical member 26a secured to connector section 21 comprise a deceleration stop. When the aircraft is slowed during a landing a considerable forward force may be exerted due to the inertia of the afterburner assembly, and in such event flange 26 will fit into conical member 26a and prevent an axial collapse of the bellows 24a. Acceleration and gas pressure forces are taken care of by the contact of surfaces 23 and 23a. Surface 23a is heavily chrome plated as is conventional in certain types of ball joints to provide a low coefficient of friction and prevent seizing. As a safety attachment device on the flexible joint, four short safety tie cables 27, Figs. 2, 3, and 4, with swaged terminals are secured in brackets 28 and 28a welded to diffuser 22 and connector section 21, respectively. Cables 27 are allowed sufficient overlength so that they do not interfere with the flexing action of the flexible joint.

As best illustrated in the plan view of Figure 2, the afterburner assembly 18 comprises a diffuser section 22, an afterburner housing or shell 29, a nozzle section 30, a variable area nozzle generally indicated at 31 and a cooling shroud 32. These sections are all open end cylinders bolted together through flanged lips around their front and rear rims. It will be noted from Figure 2 that the diffuser section 22 has a gradually increasing diameter from its forward end where it is secured to the primary engine tailpipe 19 to its after end where it is secured to the afterburner housing 29. This gradual increase in diffuser diameter is of considerable importance in attaining efficient afterburner performance in that it reduces the exhaust gas velocity to a level which is more practical for sustaining combustion reliably and because it causes a rise in exhaust gas static pressure to a more efficient level for the addition of heat through combustion of the injected fuel. The afterburner mounted within the afterburner housing 29 may be of any suitable type, but is preferably of the type disclosed in Patent No. 2,701,444, issued February 8, 1955, or the type disclosed in copending application Serial No. 162,723, filed May 18, 1950, by Paul A. Pitt.

The variable area nozzle 31 mounted upon the after end of the nozzle section 30 is of the two-position type disclosed in co-pending application Serial No. 12,246. For structural details of this nozzle, reference may be had to co-pending application Serial No. 59,944, filed November 13, 1948, by Paul A. Pitt and Morris E. Nelson, now abandoned. The positioning of the nozzle 31 is controlled through a pair of air cylinders 34, to be fully described hereinafter, linked to the nozzle through the linkage generally indicated at 35. The cooling shroud 32, secured to nozzle section 30 by suitable means not shown, is provided to protect the aircraft fuselage from the extreme high temperatures developed in the nozzle section. It is of larger diameter than the nozzle section 30 and nozzle 31 and open at both ends to provide an ejector action to draw cooling air from the fuselage in over the outer surface of the nozzle section and expel it with the exhaust gases.

As explained hereinbefore, the afterburner increases the thrust produced by the primary engine by injecting fuel into the primary engine exhaust and igniting the fuel-exhaust gas mixture. The afterburner itself is comprised of fuel grids or manifolds which inject new fuel into the exhaust gases and flameholders downstream thereof which promote the propagation of a primary piloting flame pattern and the further propagation of this flame into areas between the flameholders. These are described in detail in Patent No. 2,701,444, cited above, and play no part of this invention. However, the control of fuel supply to the afterburner is a part of this invention and will now be described.

*Fuel control*

Having reference to Figure 4, the afterburner fuel pump is generally indicated at 36. This unit comprises a gear type pump 37 directly connected to a speed reducing gear box 38 on the drive end of an intermittent duty, explosion-resistant, air cooled, D.-C., series wound motor 39. The pump receives fuel from the main aircraft supply through line 40 and delivers it to the burner manifold through the various control valves to be described.

The shut-off valve in the fuel supply line is generally indicated at 41, Figures 4 and 5. This valve is an assembly of a shut-off valve 42 and a solenoid 43, the latter having an actuator coil, a holding coil and a switch, not shown, and a spring loaded normally extended plunger 44, Figure 5. The valve piston 45 is secured at one end to the solenoid plunger 44 and is provided with a square center section 47 with a hole 48 drilled therethrough parallel to the flow line. The other end of piston 45 passes through a gland 49 and extends below the valve body to provide a manual control attachment 50. A shear seal 52 is spring pressed against the flat side of piston 45 and prevents leakage through the closed valve. The actuator coil of the solenoid is energized by a relay in the control box 54 when the afterburner switch 55 is closed, said control box and afterburner switch to be more fully explained hereinafter. This retracts the plunger 44 and moves piston 45 to a position which allows fuel to flow from the inlet port 56, through the hole 48 in the piston, and out the outlet port 57 connected by line 58 to the afterburner fuel manifold. When the plunger 44 is fully retracted it operates the internal solenoid switch which de-energizes the actuator coil and at the same time causes the holding coil to become energized so that the piston is held in the open position. When the afterburner switch 55 is opened the holding coil is deenergized and the solenoid switch action reversed, whereby solenoid plunger 44, relieved from the holding coil, extends by spring action and moves piston 45 to a position which displaces hole 48 stopping the flow of fuel through the valve. In addition to this normal action, any inadvertent blowout or failure of D.-C. power supply will be reflected in the control box 54 which will instantly deenergize the solenoid shutting off the fuel through the valve as will be more fully described hereinafter.

The first valve in the fuel supply line is the pressure operated valve, generally indicated at 59, Figures 4 and 6. Valve 59 is connected to the discharge side of the fuel pump 37 by means of line 60. This valve is a pressure operated fuel regulator and consists of three separate valves and a pressure controlled actuating mechanism. All these units are contained in the single housing 59 which has five fuel ports and two air ports. The flow of fuel from the aircraft supply and afterburner fuel pump 37, through the fuel shut-off valve 41 to the afterburner fuel grid is regulated by the three valves in the pressure operated valve housing 59 modified by a motor-driven by-pass valve to be described. Combined operation of these four valves automatically provides a supply of fuel to the afterburner at a rate of flow which insures afterburning at the rate necessary to maintain normal operating conditions in the primary engine for all flight conditions.

The principal valve of the combination in valve housing 59 is control valve 61, Figure 6. The other two valves are the regulator valve 62 and the discharge valve 64. The control valve 61 is a balanced poppet type with a spring loaded stem 65 and two valve seats 66 and 67. The inlet chamber 68 of valve 61 receives fuel from the inlet port 69, connected by line 60 to pump 37. The lower outlet chamber 70 of valve 61 discharges fuel through the port 71, connected by line 72 to the inlet port 56 of fuel shut-off valve 41, Figure 4, and also through the port 73 to a bypass line 74 leading to the motor-driven valve, generally indicated at 75. Control valve 61 is actuated by an altitude bellows, generally indicated at 76, which is operably connected to the valve through the lever assembly, generally indicated at 77 and best illustrated in the plan view of Figure 7. The positioning of control valve 61 serves to increase or decrease fuel flow to the afterburner according to the pressure differential between primary engine compressor discharge and inlet total air pressure. This differential is established in the altitude bellows chamber 78 and transmitted by the lever assembly 77 into an opening and closing movement of the control valve 61. Two ducts 79 and 80 in the valve housing 59 prevent fuel leakage from the control valve 61 through the lever bore 82 into the bellows chamber 78. The duct 79 connects bore 82 to the regulator valve outlet 84, and duct 80 connects bore 82 to the port 85 which is connected to a drain line 86.

The altitude bellows 76, Figure 6, is an assembly comprised of a metal bellows 87, bellows cap 88, compression spring 89 and adjusting screw 90. Compression spring 89 is compressed between bellows cap 88 and a collar 92 adjustably positioned by the screw 90. Bellows 76 is mounted as shown in bellows chamber 78 which has two air inlet ports 94 and 95. Compressor inlet air enters port 94 and is directed into the bellows, while compressor discharge air enters port 95 and fills the chamber around the bellows. Ports 94 and 95 are connected to ports, not shown, at the inlet side and discharge side of the compressor by means of air lines 96 and 97, respectively. There is no air flow through chamber 78 other than that caused by bellows expansion and contraction due to air pressure differential. The bellows cap 88 is secured at its other end to the stem of the control valve 61. Expansion and contraction of the bellows 87, caused by the air pressure differential and bellows spring action, thus operate the control valve 61.

The regulator valve 62 is a spring loaded, adjustable, sleeve valve assembly which receives pressurized fuel from both sides of the control valve 61. Fuel pressure from the control valve inlet port 69 acts against one side 98 of the valve 62 against the spring loading 99, while fuel pressure from the upper outlet chamber 100 of control valve 61 acts against the other side 101 of the valve and with the spring loading 99. The passage between upper outlet chamber 100 and the upper side of valve 62 is indicated at 102 and has a filter 103 mounted therein. When the pressure of the control valve inlet chamber 68 is approximately 20 p. s. i. greater than the pressure of the upper outlet chamber 100, regulator valve 62 opens and discharges fuel through the port 84 into a bypass 104 leading to the afterburner fuel pump inlet line 40, Figure 4. This action and the reverse action maintain a continuous regulation of fuel pressure which holds the control valve inlet pressure approximately 20 p. s. i. above its outlet pressure.

The discharge valve 64 is a spring loaded poppet and seat. It is located in the passage between the lower outlet chamber 70 of valve 61 and discharge port 71 and functions to keep outlet pressures sufficiently above the fuel pump inlet pressure to insure proper operation of the motor driven valve 75.

The motor-driven valve 75, Figures 4 and 8–11, is a smooth acting fuel control valve installed in a fuel bypass line, comprising line 74 leading from the outlet side of the pressure operated valve 59 to the inlet side of motor operated valve 75; line 105, which has a one-way check valve 106 mounted therein, leading from the outlet side of valve 75 to the fuel pump supply line 40; and supply line 40 into the inlet side of the afterburner fuel pump 37. This valve is actuated by the fuel control amplifier 108, to be described, according to turbine discharge temperature variations from required value. It functions to provide a close limit, vernier control to the broader fuel regulating action of the pressure operated valve 59. Valve 75 and its actuating motor assembly are designed to be explosion proof. The valve motor is a reversible variable speed motor, generally indicated at 110, Figure 8, enclosed in a sealed chamber 112 or the valve housing 75. An explosion proof cover 114 mounted below valve housing 75 encloses a gear train, generally indicated at 115, an overriding friction clutch 116, an adjustable stop device 117 and a feed back potentiometer 118. A pinion 119 on the end of the motor shaft extends through the bottom of the valve body and meshes with the gear train which acts through the friction clutch 116 to turn the valve disk shaft 120.

The valve body, generally indicated at 122, is a machined casting with an inlet port 124 at the top and an outlet port 125 at the side. The valve proper, Figures 8–11, consists of the valve disk 126, valve seat 127 and a flexible strap 128 of some suitable material such as "Fairprene" attached at one end 129 to the disk 126 and at the other end 130 to seat 127. Valve seat 127 is a cup or drum installed open end up in the valve body and is sealed fuel-tight as shown. The wall of seat 127 is slotted partially around its circumference at 132 permitting communication between the inside of the seat and a cavity 134 in the valve body which encircles the seat and communicates with the outlet port 125. Valve disk 126 is a cup similar to the valve seat 127, secured, open end down, to the upper end of shaft 120 inside the seat.

When the motor 110 rotates valve disk 126 clockwise, the strap is pulled away from the slot 132 in the valve seat wall and wound around the disk as shown in Figures 9 and 11, permitting fuel to flow from the inlet port 124 through the slot 132 to the outlet port 125. When the disk is rotated counterclockwise the strap is unwound and moved outward against the valve seat wall as shown in Figures 8 and 10 thereby closing the slot and preventing flow through the valve. Fuel pressure holds the strap tight against the slot and effects a leakproof closure. The adjustable device 117 is an index segment and pin which halts disk rotation at adjustable limits of travel in either direction. Adjustment of the stop point of the disc 126 may be effected by removing the pin and rotating the index segment as many notches in either direction as desirable. The downwardly projecting portion of the index segment thereafter cooperates with the projecting end of the pin to limit rotation of the disc 126 in both directions. The friction clutch 116 is incorporated in the movement assembly to allow a slight over-ride by the motor when the stop checks the disk movement. The potentiometer 118 is a conventional servo feed-back device which signals valve rate of travel to the fuel control amplifier 108 which stabilizes or dampens valve opening and closing.

The drive motor 110 is a two phase, squirrel cage, explosion proof motor powered by a 50 volt, 400 cycle A.-C. circuit from the fuel control amplifier 108. It is capable of reversing the direction of rotation in one-tenth of a second. The motor includes two separate 50 volt windings, one continuously excited and one controlled by the amplifier to vary the speed and direction of rotation. When the control winding voltage is shifted in phase by 180 degrees, the motor reverses. The motor speed at any time, assuming a constant excitation voltage, is approximately proportional to the magnitude of the control voltage.

The fuel control amplifier 108, Figure 4, is a hermetically sealed cylindrical housing 140 enclosing an assembly, not shown, of "Microsen" units, vacuum tubes, a power and output transformer and other necessary items of associated equipment. An end panel 142 on the housing provides mounting for the necessary connectors and studs, a fuse receptacle, a range adjusting screw and a sensitivity adjusting dial, not shown. One of the connectors receives a conductor 144 which carries the 115 volt, 400 cycle A.-C. power lead from the control box 54, while the other connector receives the two conductors carrying the 115 volt, 400 cycle lead to the motor 110 and potentiometer 118, respectively, of the motor driven valve 75. Two terminal studs 147 on the panel 142 serve as connectors for the leads from a thermocouple harness 150, to be described. The amplifier 108 receives 115 volt, 400 cycle, single phase, A.-C. power from control box 54 and a low voltage, variable, thermal-generated, D.-C. signal from the thermocouples, described below, proportional to the turbine discharge temperature. It transforms the power circuit into a 50 volt, 400 cycle, two phase, A.-C. controlled power for the motor driven valve 75, which is varied according to the low voltage thermocouple circuit fluctuations and stabilized by the feed-back signals from the potentiometer 118 on valve 75. The amplifier per se plays no part of this invention; however, for a more detailed description reference may be had to the article "Anti-hunt servo amplifier," by J. F. Engelberger in the February 1950 issue of Electrical Manufacturing. In connection with the vernier control of valve 75 it should be pointed out that if for some reason there were an electronic failure in the amplifier 108 rendering the valve inoperative, the more rugged pressure operated valve 59 could bear the full burden of fuel regulation within somewhat wider limits which the engine could safely withstand until such time as repairs could be made.

Four "Chromel-Alumel" thermocouples 152, Figure 4, are mounted in bosses welded to the diffuser section 22 of the afterburner assembly, and are located just behind the flexible joint 20, spaced at 90 degrees intervals around the diffuser circumference. The "Chromel" and "Alumel" terminals are connected in parallel to similar terminals on the thermocouple harness 150. The dissimilar metals at the tip of the thermocouples generate a millivolt D.-C. power which varies according to temperature changes of the exhaust gases. This power is transmitted through the harness 150 to the fuel control amplifier 108. There it functions as an actuator to regulate the variable A.-C. power circuit between the amplifier 108 and the motor driven valve 75, as explained hereinbefore.

The thermocouple harness 150 is a heat resistant cable sheathed in stainless steel metal braid. It has a cable terminal 154 on each end, and four pairs of chromel-to-chromel or alumel-to-alumel taps 155 connecting it with the thermocouple terminals. The cable terminals 154 are connected with conventional wiring to the studs 147 on the fuel control amplifier panel 142. A resistor 156 is installed in the circuit between the harness 150 and amplifier panel 142 to provide a total resistance of 8 ohms plus or minus 0.05 ohm at all times.

*Ignition control*

The afterburner ignition is provided by the operation of two igniter plugs 160, Figure 4, located in the afterburner housing 29 of the afterburner assembly. For a detailed description of the exact location and functions of the igniter plugs in the afterburner, reference may be had to the aforesaid Patent 2,701,444. The plugs 160 are energized by D.-C. power from the control box 54. In order to insure a strong, hot spark capable of instantly igniting the fuel gas mixture passing through the afterburner, a high tension vibrator ignition unit 162 is installed in each ignitor plug circuit.

*Variable nozzle control*

The controls for regulating the positions of the variable area nozzle include a pressure switch, an actuator control valve, and a pair of fluid motor nozzle actuators;

these are the essential elements and together with associated equipment they comprise the nozzle control system.

The pressure switch, generally indicated 170, Figures 4 and 12, is a single pole double throw switch installed in a pressure tight, cylindrical housing 172. Two flexible diaphragms 174 and 175 of some suitable material such as silicone rubber divide the housing 172 into three separate cells 176, 177, and 178. Each of these cells is open to a different pressure region in the afterburner assembly and is connected thereto by means of a suitable tubing line having pressure tight fittings. Cell 176 is pressurized by exhaust gases P1 from a point just ahead of the afterburner; cell 177 is pressurized by exhaust gases P2 from a point just behind the afterburner; and cell 178 is pressurized by exhaust gases P3 from a point just ahead of the variable area nozzle. The effective area of the upper diaphragm 174 is preferably from approximately two to three times that of the lower diaphragm 175, the two diaphragms being joined in the center by metal discs 179 and a diaphragm post 180 so that they can move only in unison.

The switch mechanism is located in the upper cell 177 and comprises a pair of fixed contacts 182 and 183, and a movable center contact 184 mounted upon an arm 185 attached to the diaphragm post 180. The fixed contact 182 may be adjusted to regulate the width of the switch gap between the contacts 182 and 183 by means of a preset adjusting device 186. All three contacts are wired as shown to a standard terminal receptacle 187 mounted on the housing. The movable center contact 184 moves between fixed contacts 182 and 183 as diaphragm 180 is displaced by pressure variations in the three cells. Thus, during normal engine operation, with or without afterburning, exhaust gas pressures at the three points in the afterburner assembly designated hereinbefore as P1, P2, and P3 establish a varying ratio between the pressure drop from P2 to P3 and the drop from P1 to P3. These pressures are transmitted to their corresponding cells in the pressure switch 170 where they combine to produce an overbalance of pressure above or below the two diaphragms 174 and 175.

When combustion takes place, the two diaphragms 174 and 175 are moved towards the bottom of the pressure switch, as viewed in Figure 12, and movable contact 184 moves into contact with fixed contact 183. This movement is caused by a force resulting from the P2 pressure less the P3 pressure, acting on the upper diaphragm 174, becoming greater than the opposing force of the P1 pressure less the P3 pressure, acting against the lower diaphragm 175. Inasmuch as the ratio between upper diaphragm area 174 and lower diaphragm area 175 is preferably between 2 to 1 and 3 to 1, this condition may also be expressed as the ratio of the P2 minus the P3 drop to the P1 minus the P3 drop (which is indicative of the amount of afterburning) becoming greater than one-half to one-third, or expressed mathematically as $$\left(\frac{P2-P3}{P1-P3}\right) > \tfrac{1}{2} \text{ to } \tfrac{1}{3}$$

The closing of the contacts 183 and 184 places the switch in its afterburning position, to be designated hereafter as the AB position, and completes a circuit through the contacts and a relay in the control box 54, thereby energizing the relay. The relay, in turn, energizes the actuator control valve 190, to be described, causing the two position nozzle 31 to open. At the same time the relay deenergizes the ignition unit, and the ignition plugs cease to operate. In addition, control box operation, as will be explained hereinafter, holds the nozzle open and the ignition shut off until the switch moves to its no-burning position, hereinafter designated as the NB position. This holding is not effected by any other switch movement. Movement of the switch to its NB position occurs when contact 184 moves into contact with upper contact 182, and is caused by the ratio between the P2 to P3 pressure drop and the P1 to P3 pressure becoming less than one-half or one-third, due to loss of combustion from shut-down or blowout.

When the switch moves to its NB position, a circuit is closed through switch contacts 182 and 184 and the control box 54. Operation of the control box then functions to deenergize actuator control valve 190 which functions to close the two position nozzle. By the same control box operation the fuel shut-off valve 41 is closed and the afterburner fuel pump 37 is stopped.

The pressure switch will operate in this manner under all conditions of altitude and air speed. Its characteristics insure not only a quick opening of the nozzle 31 when combustion starts thereby avoiding engine overheating or loss of power, but also protect against premature nozzle opening and loss of thrust by opening the nozzle only after there is some evidence of combustion. It also closes the nozzle the instant combustion ceases to prevent a sudden loss of normal engine thrust.

The actuator control valve, generally indicated at 190, Figures 4 and 13, is an assembly of a four-way air valve 192 and a solenoid 194, the latter having an actuating coil, a holding coil, and a switch, not shown, and a spring loaded, normally extended plunger 195, Figure 13. The valve piston 196 is secured at one end to the solenoid plunger 195 and is provided with a square center section 197 having three passages 198, 199, and 200 therethrough. The other end of piston 196 passes through a gland 202 and extends below the valve body to provide a manual control attachment 204. The valve body 192 has an inlet port 205, two outlet ports 206 and 207, all in the same plane, and a return port 208 at right angles to the inlet and outlet ports and open to the atmosphere. Shear seals 209 are spring pressed against the flat sides of piston 196 within the ports 205, 206, and 207 to eliminate internal air leakage. The inlet port 205 is connected and always open to the discharge side of the engine air compressor by means of an extension 210 to the line 97, Figure 4, leading from the discharge side of the compressor as explained hereinbefore. The outlet port 206 is connected by air line 212 to the rear fittings 214 on both upper and lower two-position nozzle actuator air cylinders 34, Figure 4. These fittings admit pressurized air to the cylinders 34 behind the cylinder pistons, not shown, causing the nozzle 31 to open, Figure 2. The outlet port 207 is connected by air line 215 to the forward fittings 216 on both air cylinders 34 and admits pressurized air in front of the cylinder pistons causing the nozzle 31 to close. It is an advantage of the nozzle actuator system that the energy used to actuate the nozzle is as dependable as the primary engine itself since it is the primary engine which supplies this energy at no extra cost.

The actuator coil of the solenoid 194 is energized by a relay in the control box 54, to be described, when the pressure switch 170 is moved to its afterburner position, as described hereinbefore. This retracts plunger 195 and moves piston 196 to a position whereby pressurized air is directed from the inlet port 205 through the outlet port 206, causing nozzle 31 to open. When plunger 195 is fully retracted, it operates the internal solenoid switch, which deenergizes the actuator coil and at the same time causes the holding circuit to become energized so that piston 196 is held in its retracted position causing nozzle 31 to remain in open position. When the pressure switch 170 is moved to its NB position, the holding coil is deenergized, and the solenoid switch action reversed, whereby solenoid plunger 195 extends by spring action and moves piston 196 to a position whereby the pressurized air is directed through the outlet port 207 causing nozzle 31 to close. In either retracted or extended position of piston 196, one of the outlets 206 or 207 is open to the atmosphere through passage 200 and return port 208 which is connected to an open line 217, Figure 4. This relieves pressure from one side of the air cylinder piston and allows it to be moved by the pressure exerted on the opposite side. In this manner a positive, automatic control of the two position nozzle 31 is assured at all times. The valve 190 normally holds the nozzle in its closed position, but insures an immediate opening as soon as afterburning is initiated, followed by closing the moment afterburning is shut down or inadvertently blown out, as will be described hereinafter.

*Central control box*

The electrical controls for the afterburner assembly control system, Figures 4 and 14, are centered in the control box 54, which distributes power from the aircraft electrical supply to the electrically controlled afterburner accessories. The electrical details of this control box, i. e. the operation of the electrical circuits in combination with the electrical units therein, play no part of this invention and will be only generally described in this application. However, for a full disclosure of the detailed operation of the control box, reference may be had to co-pending application Serial No. 185,115 for Afterburner Electric Controls filed on even date by Philip M. Klauber.

The primary electrical units in the control box are five hermetically sealed relays each having a plurality of sets of contacts. These relays are secured to a mounting plate in the box and are interconnected as disclosed in application Serial No. 185,115, cited just above, by circuits which are also wired to prong and socket receptacles 220 on the side of the box. These internal control box circuits are protected by a 15 amp. push-pull overload circuit breaker.

Three separately energized agents put the control box relays in operation. These are the manual amplifier switch 224 and afterburner switch 55 in the cockpit of the aircraft and the automatically operated pressure switch 170. When afterburning is started by the cockpit switches, control box 54 functions automatically until afterburning is manually shut down.

The afterburner fuel pump contactor 225 functions with the relays in the control box 54 but is located in the aircraft near the pump 37 in order to eliminate heavy cable connections. Contactor 225 is wired between the aircraft D.-C. source and the pump but is energized through a circuit in the control box.

*Sequence of operation*

Referring now to Figures 4 and 14, and having in mind the foregoing description of the individual units comprising the control system, the sequence of operation of the novel control system embodied herein will be described.

As soon as the main engine throttle 230, Figure 4, is moved away from its full off position the amplifier switch 224 is closed; this occurs when the primary engine is started. Closing amplifier switch 224 completes a circuit from the aircraft D.-C. source through a first relay in control box 54 causing it to become energized. This energized relay in turn closes a contact allowing D.-C. voltage to be applied to the normally open contact of the remaining relays in the control box so that they are in condition for instant response to further operation. In addition, the first energized relay closes other contacts completing the circuit which supplies the 115 volt, 400 cycle A.-C. power from the aircraft A.-C. source to the fuel control amplifier 108. The control system is thus placed in a state of readiness for immediate response when the afterburner is switched on.

When it is desired to switch the afterburner on, throttle 230 is moved to its afterburning position, or all the way to the left in Figure 4, which closes the afterburner switch 55. Closing switch 55 completes a D.-C. circuit through a second and third relay in the control box energizing these relays. The energized second and third relays close a series of contacts which simultaneously complete D.-C. circuits through a relay 231 for the aircraft fuel booster pump 232, Figure 14, the afterburner fuel pump contactor 225, the fuel shut off valve 41, and the two ignition units 162 all of which are grounded on one side as shown in Figure 14. On completion of these circuits booster pump 232 starts to supply the required fuel flow to afterburner fuel pump 37 which has been put in operation by contactor 225, shut off valve 41 opens, pump 37 pumps fuel through the fuel supply line to the afterburner fuel manifold, and sparking starts at the ignitor plugs 160, all operations combining to initiate afterburner combustion.

As soon as combustion is initiated, the movable contact of the pressure switch 170 moves to its AB position due to the resultant pressure gradient change in the tailpipe. Movement of pressure switch 170 to its AB position completes a circuit which energizes a fourth relay in the control box 54. The energized fourth relay in turn closes a set of contacts which causes the actuator control valve 190 to be energized so that the two-position nozzle actuator assembly operates to open the nozzle 31 to accommodate the afterburning. Energizing the fourth relay also causes a set of contacts closed by the energized second and third relays to be opened, thus deenergizing ignition units 162 so that the sparking stops. This last sequence of operations occurs within approximately one second from the start of combustion and places the afterburner assembly in full operating condition. It should be pointed out here that should unusual changes in pressure conditions or inertia occur in the afterburner assembly during flight, either for short or long periods of time, and should these conditions cause the pressure switch 170 to move off its AB position, the fourth relay still remains energized at any intermediate position of the movable contact of the pressure switch once it has touched the AB position, and only when the movable contact actually touches the NB position will the relay be deenergized causing the afterburner to shut down. This provides additional protection against premature shut down of the afterburner due to various unpredictable contingencies during flight such as sharp gust loads, flight maneuver loads and sudden changes in atmospheric conditions. Such a provision is important for if the pilot has turned the afterburner on it is usually because the occasion is critical and added power which can be relied upon is urgently needed.

In the reverse operation, afterburner switch 55 is opened by movement of engine throttle 230 towards the right, Figure 4. This deenergizes the second, third and fourth relays causing fuel shut-off valve 41 to close, contactor 225 to be deenergized cutting off fuel pump 39, actuator control valve 190 to be deenergized closing nozzle 31, and fuel booster pump relay 231 to be deenergized cutting off booster pump 232. Since fuel is no longer supplied to the afterburner fuel manifold and ignition was previously cut off, afterburner combustion ceases. The aircraft will then be in normal non-afterburning condition and be propelled by the primary engine alone. When the primary engine is shut off by moving throttle 230 all the way to the right in Figure 4, amplifier switch 224 is opened deenergizing the first relay and the fuel control amplifier 108.

The preceding paragraph describes the normal shut down of the afterburner assembly. In the event of an inadvertent shut down due to blowout, electrical malfunctioning or other reasons the following sequence of operations will take place to avoid the sudden loss of thrust which will follow loss of combustion. These operations will only occur, however, if combustion is lost while the afterburner switch 55 is closed. The loss of combustion causes pressure switch 170 to move to its NB position deenergizing the fourth relay and, because the afterburner switch 55 is still closed, energizing a fifth relay. Energizing the fifth relay causes contacts to open which deenergize the second and third relays, and the normal shut down sequence of operation then takes place. The fifth relay will remain energized preventing further afterburning until the afterburner switch 55 is opened and again closed. In other words, the pilot must move the throttle 230 out of its afterburning position before a normal start can again be made.

The sequence of operations just described is shown in the chart in Figure 15. This chart which is simplified in form and not to scale illustrates the approximate relative sequence of operations through one afterburning cycle, from no afterburning to afterburning and return. As explained hereinbefore, the cycle starts with the closing of the afterburner switch 55 and the first thing that happens is the initiation of fuel flow to the afterburner. After a minute time interval, exaggerated in the chart, combustion starts and the resultant change in afterburner pressure gradient causes the nozzle to be opened a fraction of a second later. It will be noted that during this fraction of a second between initiation of combustion and the moment when the nozzle reaches its full open position, the rated thrust rises rapidly and the various turbine discharge conditions are above or below normal as indicated. As explained hereinbefore this deviation from normal turbine discharge conditions is the thing that must be avoided for any length of time, and it will be seen that in the present invention there is a return to normal conditions very shortly after the nozzle is fully open. At this point the rated thrust has also reached an approximately constant value lower than its initial peak but higher than its non-afterburning value. The lines of the chart are shown to have constant values except for transition periods and this would represent the flight condition with no inlet air variations, i. e. with fixed altitude and airspeed. Actually, this will never occur in flight; however, the purpose of the chart is to illustrate sequence of operation during the transition periods. As shown on the chart, even under ideally constant flight conditions there would still be slight variations in the afterburner fuel feed. This is due to the temperature sensing and feed-back arrangement of the motor driven valve 75.

When the afterburner switch is opened the chart shows that the sequence initiating afterburning is in effect just reversed. The rated thrust drops immediately to a value below the non-afterburning normal and then returns to normal as the nozzle reaches its closed position. The fuel supply is cut off and at the same time the actuator control valve receives the signal to close the nozzle which starts to close a fraction of a second later. As with the initiation of afterburning, the turbine discharge conditions deviate from normal in the short increment of time between the signal to shut down and when the nozzle reaches its fully closed position.

It should be noted that if the transition were perfect with all the factors perfectly balancing during the transition—principally rate of jet nozzle area increase compared to rate of jet nozzle gas specific volume increase—there would be no ripples or variations from normal. Even though brief deviations from normal are permitted during the transition periods because perfect control of all factors is impractical to maintain, it should be understood that the applicant recognizes the relative limits within which the many factors must be maintained, and that each of the controlling factors is suitably maintained, both in time rate of operation and sequence of operation. One of the most important rate of time functions which must be maintained within suitable limits is the gradient of combustion build-up from initiation to full rated heat release. Therefore, this system of controls depends upon a combustion burner configuration which "wastes" a portion of the initial fuel (injected between the flame holders of the afterburner) and thereby achieves the proper rapid gradient of combustion build-up without entering the damaging area of too rapid a combustion build-up referred to as explosive ignition. A somewhat similar situation may be cited from the automotive industry which considers gear-shifting as quite practical despite its known momentary inefficiency. This automotive process is comparable to the transition or "shifting" to and from afterburning and also shows a ripple in transition whether manual or automatic shifting is used.

From the foregoing it will be apparent that the invention embodied herein provides a safe and accurate automatic control system for use in a turbojet-afterburner assembly combination. This system allows effective and dependable use of the tremendous additional power gained from the afterburner and requires only a negligible amount of effort on the part of the pilot to avail himself of this power in times of need. In addition, this novel control system provides for highly efficient operation of the jet power plant under all conditions of flight and in the event of such unexpected happenings as loss of afterburner combustion due to blowout.

This invention may be embodied in other specific forms without departing from the spirit of my invention or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a jet power plant comprising a primary jet engine having an air compressor and a turbine, and an afterburner assembly having an afterburner and a variable area nozzle; a control system comprising means to supply fuel to said afterburner including a fuel pump; means to initiate combustion of said fuel in said afterburner assembly; means to regulate the fuel flow from said pump to said afterburner including a pressure operated valve in said fuel line; means controlled by pressures bled from the inlet and outlet sides of said air compressor for actuating said pressure actuated valve, a fuel by-pass line around said pressure operated valve, and means in said fuel by-pass line controlled by temperature variations downstream of said turbine; and means to vary the area of said variable area nozzle solely responsive to pressure variations in said afterburner assembly due to combustion of the fuel therein.

2. In a jet power plant comprising a primary jet engine having an air compressor and a turbine, and an afterburner assembly having an afterburner and a variable area nozzle; a control system comprising means to supply fuel to said afterburner including a fuel pump and line from said pump to said afterburner; ignition means to initiate combustion of said fuel in said afterburner assembly; means to regulate the fuel flow from said pump to said afterburner including a pressure operated valve in said fuel line, means controlled by pressures bled from the inlet and outlet side of said air compressor for actuating said pressure operated valve, a fuel by-pass line around said pressure operated valve, and a motor driven valve in said fuel by-pass line controlled by temperature variations downstream of said turbine; and means to vary the area of said variable area nozzle including a pressure responsive switch; means for applying the pressures bled from a plurality of points upstream of said variable area nozzle to said pressure responsive switch to thereby control said pressure responsive switch; a pressure operated nozzle actuating assembly; an actuator control valve operable to selectively connect said assembly to a source of pressure; and means actuated by said pressure responsive switch for operating said actuator control valve.

3. In a jet power plant comprising a primary jet engine having an air compressor and a turbine, and an afterburner assembly having an afterburner and a variable area nozzle; a control system comprising a normally open afterburner switch to initiate afterburner operation, means operable upon closing said afterburner switch to pump fuel to said afterburner, means operable upon closing said afterburner switch to initiate combustion of fuel pumped into said afterburner, means responsive to variations in pressure rise across said air compressor to regulate fuel flow to said afterburner, means responsive to temperature variations downstream of said turbine to regulate fuel flow to said afterburner in conjunction with said last-named means, means responsive to pressure variations arising from combustion initiated in said afterburner assembly, and means actuated by said last-named means to regulate the area of said variable area nozzle in response to the pressure variations in said afterburner assembly.

4. In a jet power plant comprising a primary jet engine having an air compressor and a turbine, and an afterburner assembly having an afterburner and a variable area nozzle; an afterburner assembly control system comprising a normally open afterburner switch to initiate afterburner operation; means to supply fuel to said afterburner including a fuel source, a fuel line from said source to said afterburner, a fuel pump on said fuel line operable upon closing said afterburner switch, and a normally closed fuel shut-off valve on said fuel line moved to open position upon closing said afterburner switch; means operable upon closing said afterburner switch to initiate combustion of fuel pumped to said afterburner; means on said fuel line responsive to variations in pressure rise across said air compressor to provide broad regulation of fuel flow to said afterburner; a by-pass fuel line around said last-named means; means on said by-pass line responsive to temperature variations downstream of said turbine to provide a fine regulation of fuel flow to said afterburner; means actuated by the pressure gradient change created in said afterburner assembly by initiation of combustion therein; and means actuated by said last-named means to increase the area of said variable area nozzle when said last-named means is actuated by said pressure gradient change.

5. In a jet power plant comprising a primary jet engine and an afterburner assembly having a fuel manifold; a fuel control system comprising a fuel source, a fuel line connecting said source with said manifold, a pump in said fuel line to pump fuel from said source to said manifold, a pressure operated valve on said line; means responsive to pressure variations in said primary jet engine for actuating said pressure operated valve to regulate fuel flow through said fuel line, a by-pass fuel line around said pressure operated valve, and a motor driven valve in said by-pass line; means responsive solely to temperature variations in the outlet of said primary jet engine for actuating said motor driven valve to regulate fuel flow through said fuel line.

6. In a jet power plant comprising a primary jet engine having an air compressor and a turbine, and an afterburner assembly having a fuel manifold and ignition means therefor; a fuel control system comprising a normally open afterburner switch; a fuel source; a fuel line connecting said source to said manifold; a fuel pump in said line; means operable upon closing said afterburner switch to actuate said fuel pump to pump fuel from said source to said manifold; a normally closed fuel shut-off valve in said line; means operable to open said normally closed fuel shut-off valve to open said line to the passage of fuel upon closing said afterburner switch; a pressure operated valve in said line; means responsive to variations in pressure rise across said compressor to actuate said pressure operated valve to provide broad regulation of fuel flow through said line; a by-pass fuel line around said pressure operated valve; and a motor driven valve in said by-pass line; means responsive to temperature variations downstream of said turbine to operate said motor driven valve to provide fine regulation of fuel flow through said line; whereupon closing said normally open afterburner switch causes a regulated flow of fuel to be pumped to said manifold where said ignition means ignites said fuel to produce combustion in said afterburner assembly.

References Cited in the file of this patent

UNITED STATES PATENTS

| 2,411,895 | Poole | Dec. 3, 1946 |
| 2,446,339 | Orr | Aug. 3, 1948 |
| 2,457,595 | Orr | Dec. 28, 1948 |
| 2,498,939 | Bobier | Feb. 28, 1950 |
| 2,503,006 | Stalker | Apr. 4, 1950 |
| 2,504,421 | Johnson | Apr. 18, 1950 |
| 2,514,248 | Lombard | July 4, 1950 |
| 2,520,434 | Robson | Aug. 29, 1950 |
| 2,520,967 | Schmitt | Sept. 5, 1950 |
| 2,545,703 | Orr | Mar. 20, 1951 |
| 2,580,962 | Sédille | Jan. 1, 1952 |
| 2,653,446 | Price | Sept. 29, 1953 |
| 2,667,743 | Lee | Feb. 2, 1954 |
| 2,674,843 | Lombard | Apr. 13, 1954 |
| 2,677,233 | Jordan | May 4, 1954 |

FOREIGN PATENTS

| 587,558 | Great Britain | May 7, 1947 |
| 605,093 | Great Britain | July 15, 1948 |

OTHER REFERENCES

SAE Journal, February 1949, pages 26–29.